Figure 1:
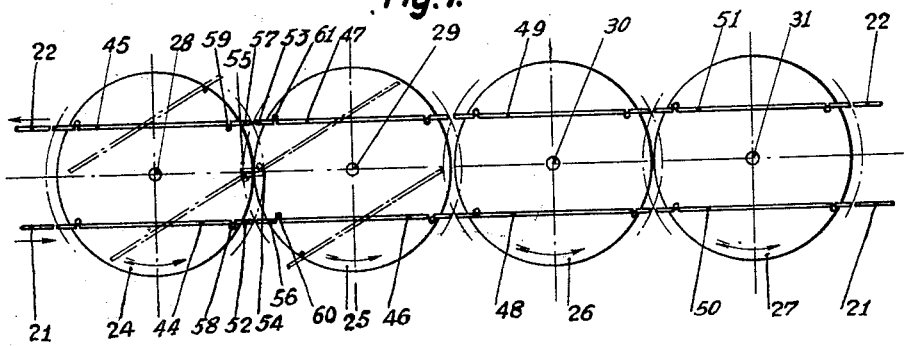

Oct. 6, 1931.  C. STEDEFELD ET AL  1,825,683
TURNING ARRANGEMENT FOR MONORAIL SUSPENDED VEHICLES
Filed April 27, 1928  3 Sheets-Sheet 1

Oct. 6, 1931.  C. STEDEFELD ET AL  1,825,683
TURNING ARRANGEMENT FOR MONORAIL SUSPENDED VEHICLES
Filed April 27, 1928  3 Sheets-Sheet 3

Patented Oct. 6, 1931

1,825,683

UNITED STATES PATENT OFFICE

CURT STEDEFELD AND WILLY BLACK, OF HEIDELBERG, GERMANY; SAID BLACK ASSIGNOR TO SAID STEDEFELD

TURNING ARRANGEMENT FOR MONORAIL SUSPENDED VEHICLES

Application filed April 27, 1928, Serial No. 273,349, and in Germany May 4, 1927.

The usual turning arrangements for railway trains are rail loops and turntables. By means of the former the whole train is turned, by the latter only the locomotive which returns to what was previously the rear end of the unturned train by a shunting line and is there re-coupled. The development of so-called high speed railways with very close train sequence will finally lead to driving vehicle trains, that is, to trains with distributed driving power, and for the very highest running speeds up to some 300 km. hour, in particular to suspended mono railways where possible, with propeller drive and torpedo shaped vehicles. Such vehicles cannot run equally well forwards and backwards, but must be turned at the ends of the line either by rail loops or by turn tables. In particular in the stated rail arrangement for high speed railways, with two lines separated according to direction this turning is also unavoidable owing to the necessity for the carrier arm from the vehicle body to the running gear to be on one particular side, see Figure 12. Rail loops take up much room, which exactly at the termini of high speed railways in large towns is extremely seldom available. Decrease of the radius of curvature to save space can only be employed with running gear pivot arrangements permitting considerable turning, which on the open line with its large radius curves involved by the high speeds are entirely unnecessary and only represent dead weight and additional costs. Turn tables can be used by themselves for individual vehicles or short vehicle trains up to about 50 metres length. Longer trains must be divided into several parts which run one after another on to the turn table and are turned one after another. So much time is lost in this, however, and such complicated procedure is involved that this method cannot be satisfactory for high speed railways with fairly close train sequence.

The present invention provides an improved solution of this problem by means of several turn bridges arranged behind one another in series, which each take a part of the train and turn these parts separately but simultaneously into the new running direction.

Figures 1 to 6 of the accompanying drawings, show various possible embodiments of the bridge series for the above method of operation. Figures 7 to 13 show the particular operating arrangements of the turn bridges, which permits the most rapid and secure division of the trains for the turning operation and recoupling for further travel.

Figure 2:
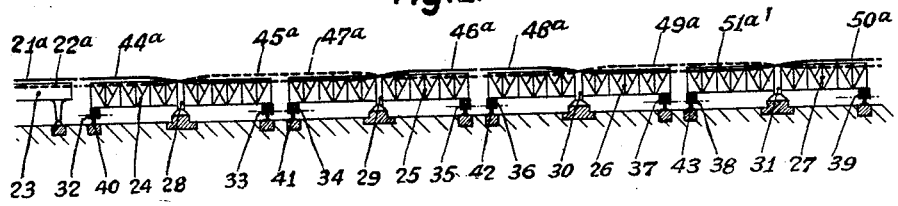
Figure 6:
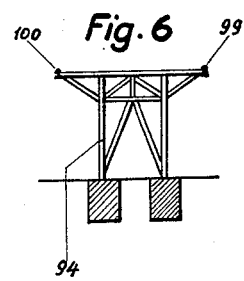

In Figure 1 (plan) and Figure 2 (side view), 21 and 22 are the fixed separate adjacent rails for the opposite directions of travel; they are secured to the carrying structure 23 by outriggers, see Figure 6. The series of, for example, four turning bridges 24, 25, 26 and 27 are supported at the centre on turning pivots 28, 29, 30 and 31 in the manner of the usual turn tables, and run with wheel trucks 32, 33, 34, 35, 36, 37, 38 and 39 on circular rails, 40, 41, 42 and 43. The ends of the rails 44 and 45, 46 and 47, 48 and 49, 50 and 51, Figure 1, and 44a, 45a, 46a and 47a, 48a and 49a, Figure 2, held on both sides by outriggers on the turning bridges 24, 25, 26 and 27, as Figure 1 shows would not pass one another during turning without special provision. For example, in turning in the direction of the arrow the rail end 52 describes the arc 54, the end 53 at the same time the arc 55, these arcs, as can be seen, intersecting. To avoid the rail ends preventing rotation various measures are possible.

In Figure 1 the rail ends, for example 52, 53, 56 and 57 are made foldable in the horizontal plane over a somewhat greater length than the overlapping of the arcs 54 and 55 requires, by means of joints 58, 59, 60 and 61. It may be seen directly from Figure 1 that the joints must yield in a folding direction opposite to the turning direction; consequently 58 and 59 lie on the side of the rails 44 and 45 opposite to the side of the rails 46 and 47 on which the joints 60 and 61 lie. They can then, as shown in dotted lines in Figure 1 yield to one another during the turning movement by folding. Naturally care must be taken by the provision of springs or the like that the folding edges always return to their rail directions.

Another arrangement is shown by Figure 2. Here the ends 21a and 22a of the fixed rails terminate at slightly differing heights. The difference is shown exaggerated; in practice it only amounts to a little over the height of the rail section. The rail ends of the bridges, fixed in contradistinction to Figure 1, lie in exactly the same way at different heights alternately, that is, at the left hand end of the bridge 24 the rail end 44a is higher than 45a, while at the right hand end 44a is lower than 45a and so forth. If the turning of the bridges of Figure 2 is followed out by the aid of Figure 1 it will be seen that in the turning movement at the left 45a passes under 21a, at the right 44a under 47a and so forth. Naturally with this method the rails on the bridges have alternating inclinations. In the left hand half of Figure 2 the respective rail lengths are shown with uniform inclinations; in the right hand half only the centre parts of the rail lengths are inclined, the main lengths being horizontal. The latter arrangement may be more advantageous for securely retaining the vehicles on the bridge, during the turning operation.

Figure 3:
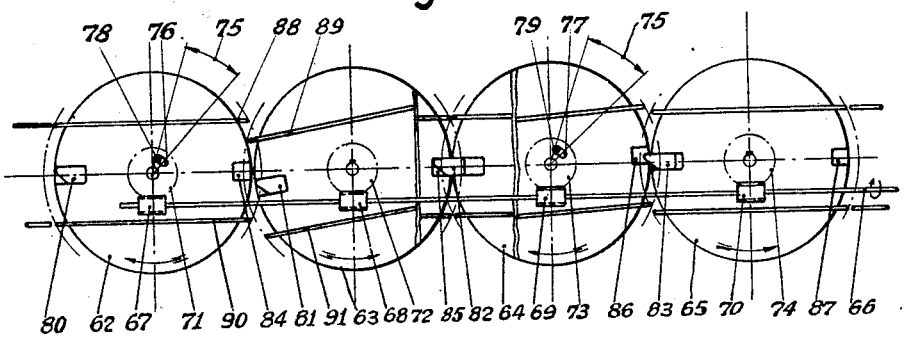

Figure 3 shows diagrammatically in plan a third method for the free turning of the bridges 62, 63, 64 and 65 in series. As shown by the arrows these turn alternately in opposite directions. 66 is the common driving shaft of all four bridges. It carries alternately right and left handed worms 67, 68, 69 and 70. Of the cooperating worm wheels 71, 72, 73 and 74 only 72 and 74 are rigidly fixed to the bridges, the other two, 71 and 73 having a small lost motion through the angle 75 in relation to the respective bridges 62 and 64, since only after rotation through this angle do the slots 76 and 77 in the wheels 71 and 73 engage the pins 78 and 79 which are rigidly secured to the bridges 62 and 64. Members 80, 81, 82 and 83 entering slots 84, 85, 86 and 87, form locks between the bridges. The turning procedure takes place as follows. After the locks formed by members 81 to 86 have been released, the driving shaft 66 commences to work. The bridges 63 and 65 immediately begin to rotate in the direction of the arrows, while the bridges 62 and 64 remain at first at rest until the lost motion between 76 and 78 and between 77 and 79 has been taken up. At this instant the bridges 63 and 65 have already taken a position—shown in the case of 63—which no longer prevent the rotation of 62 and 64. It will be seen in the case of the bridges 62 and 63 how the rail 88 always remains somewhat behind the rail 89 and in this way is free to move. The rails 90 and 91 also do not interfere with one another. The driving shaft is again stopped when bridges 63 and 65 have turned through 180°. The bridges 62 and 64 are still behind by the angle 75 as is shown on the right hand side of bridge 64. Movement by the amount short of 180° is afterwards effected by the entry of the inclined end bolts 81 and 83 into the slots 84 and 86.

Figure 4:
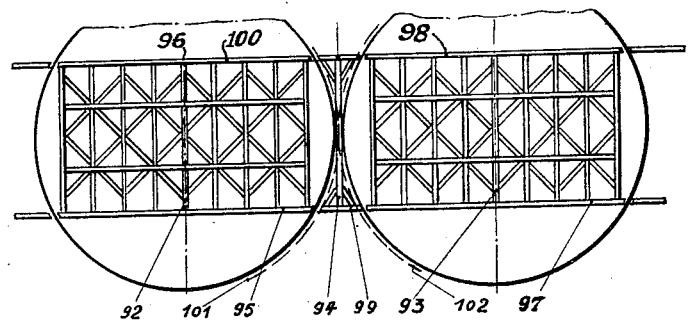
Figure 5:
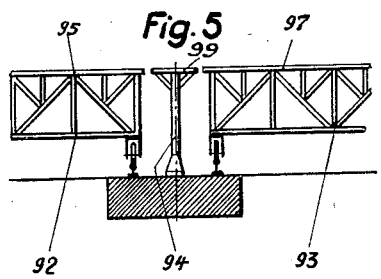

In Figure 4 (plan), Figure 5 (side view) and Figure 6 (end view) a fourth method for the close arrangement in series of turning bridges 92 and 93 without mutual interference in turning is shown. The rails 95, 96 and 97, 98 here do not reach over the contacting circles 101 and 102 of the two turning bridges and therefore can pass one another in all circumstances. On the other hand, fixed rail pieces 99 and 100 must be interposed between the rail ends of the turning bridges, which necessitates a separate carrying structure 94.

Figure 7:
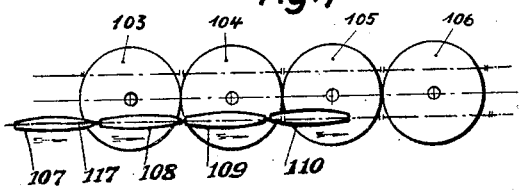
Figure 8:
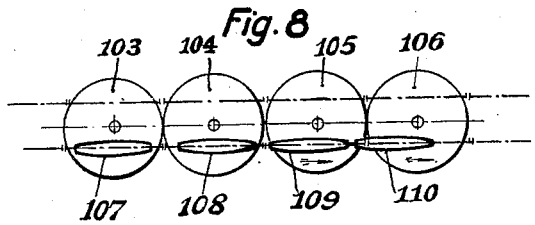
Figure 9:
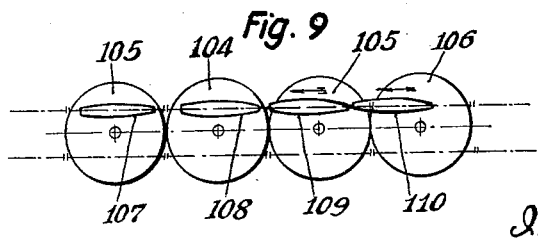

All such arrangements, apart obviously from their own advantages, are only of value when the time for the whole turning operation remains low; this is most completely obtainable by automatically effecting all operations, as shown in Figures 7–9. The four turning bridges are to serve for turning a train comprising four individual vehicles 107, 108, 109 and 110. These vehicles are here so long that one only has room on one bridge; the example applies equally well if two or three vehicle lengths could be accommodated on each bridge. The train moves at a moderate speed on to the turning apparatus, Figure 7. As soon as the last vehicle 107, is entirely on the bridge 103, it is automatically uncoupled and braked, similarly with the next vehicle as soon as it is entirely on the bridge 104 and so forth, Figure 8. As soon as all four vehicles are stationary on their respective bridges, the locking of the bridges is released and their common drive started and all the bridges turn together through 180°. When the turning is complete, the bridges are automatically locked and the brakes of the vehicles released; the train can close up in the new travel direction until automatic recoupling of the vehicles takes place, Figure 9, and can then proceed further.

The following figures show diagrammatically an example of the formation of the automatic devices for the purpose.

Figure 10:
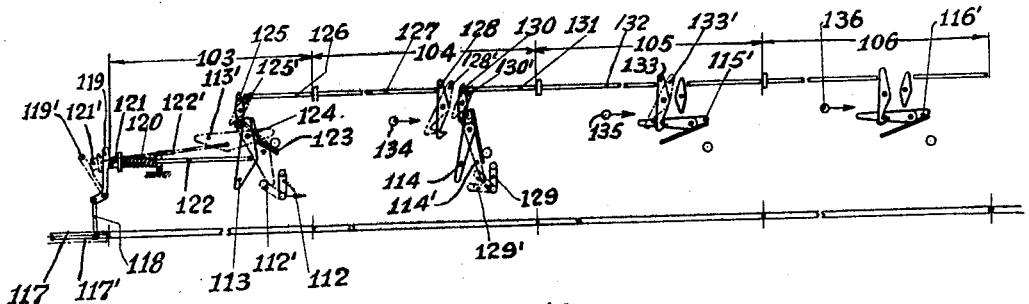
Figure 11:
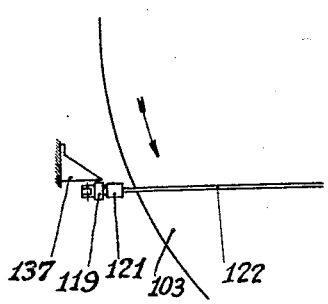
Figure 12:
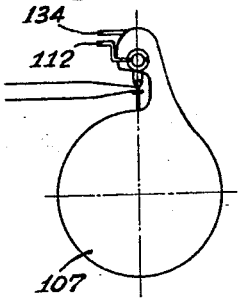
Figure 13:
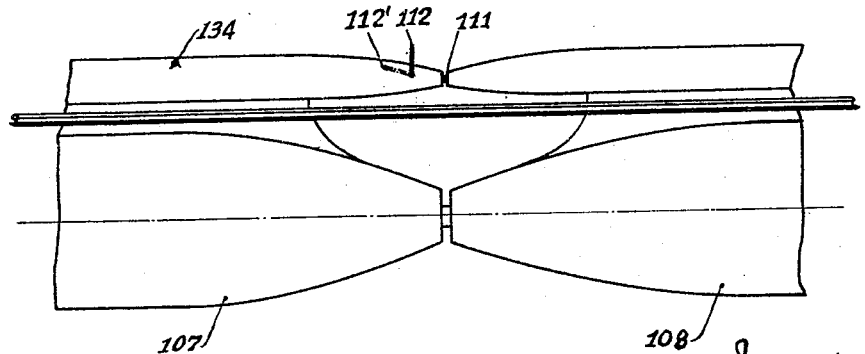

Figure 10 shows an elevation of the whole,
Figure 11 a plan of the part of the elevation above it,
Figure 12 shows an end view of a vehicle and
Figure 13 is a side view of two vehicle ends coupled together.

The vehicles are connected by automatic couplings of known construction (Schaffenberg, Willison or other system). These couplings are released by turning the release lever 112 from the upright position 112 to the inclined position 112′, which is effected by striking levers 113, 114. These striker levers 113, 114 are automatically controlled by means of the rods shown in Figures 10 and 11 in such a manner that they go into the striking position after one another only when the last vehicle 107, the last but one 108 and so forth stand entirely on the last bridge, the last bridge but one 104 and so forth. In the first place it is clear that as long as a single vehicle is still on the fixed rail section 117 leading to the turning bridges, Figure 7, none of the couplings 111 should be released, that is, the striker levers must all be turned up as the positions 113′, 115′ and 116′ show, so that the coupling release levers 112 of the vehicles can freely pass them. To achieve this the rail piece 117 is arranged to sink slightly under the weight of a vehicle thereon and thereby swings to the left, through a pull rod 118, a lever 119 having a high mechanical advantage through a pull rod 118. The bearing portion 121 of a rod 122 is pressed against the lever end 119 of a compression spring 120. It will be seen that as long as it bears a vehicle weight, the rail end has the position 117′, the rods connected thereto the position 119′, 121′, 122′ and 113′, and the coupling release levers 112 do not strike the release levers 113. When the last vehicle leaves the stationary rail end, the latter rises to the position 117, the lever mechanism takes the positions 119, 121 and 122 and turns the first striker lever downwards into the position 113, the coupling release lever of the last vehicle 107 strikes the lever 113, turns to the left to the position 112′ and thus uncouples the vehicle 117, see Figure 8.

This uncoupling procedure on bridge 103 brings the striker lever 114 of the next bridge 104 into the operating position shown in Figure 10 in the following manner; when the release lever 112 of the vehicle 107 strikes against the lever 113 the latter is turned on its pivot 124 somewhat further counterclockwise against the spring 123, its upper end moves the intermediate lever 125 to the position 125′, the rods 126 (on bridge 103) and 127 (on bridge 104) are pushed to the right, locking lever 128 is turned to position 128′, striker lever 114 falls into position 114, the coupling release lever of the last vehicle but one 108 is moved into the position 128′ and the vehicle 108 uncoupled on the bridge 104 (see Figure 8).

In a similar manner, as above described, this uncoupling action on bridge 104 from the position of rest 115′ into the working position, since the striker lever on the bridge 105 is turned from the position of rest 115′ into the working position, since striker lever 114 is turned to the position 114″ and thereby releases locking lever 133 through the members 130, 131, 132 and so forth until the whole train has been uncoupled.

It is clear without further drawing that a braking device on each vehicle (wheel brakes, track brakes or others) can be automatically applied simultaneously with the uncoupling of the respective vehicles by any usual control device (for example a compressed air valve for air brakes and so forth), so that the slowly moving vehicles after a short braking distance remain stationary on their respective bridges. The coupling levers 112′, 129′ and so forth automatically return as usual to the position 112, 129 and so forth, ready for recoupling.

The bridges 103—106, as described above, are not turned simultaneously, the vehicles reach the positions shown in Figure 9 and can again be connected together to form a coupled train. For this purpose the driver in the vehicle 110 at least must first release the brakes and move the vehicle forward until his vehicle is automatically coupled to the vehicle 109. The release of the brakes in vehicle 109 can take place automatically and in conjunction with this coupling action; then the vehicle 109 also starts and moves until coupling with the vehicle 108 with automatic release of the brakes takes place, and so forth, see Figure 9.

Alternatively the automatic release of all the brakes simultaneously can be automatically effected by known means as soon as the turning movement of the bridges is complete; it is only necessary to make these devices positively dependent on the position of the bridges.

During this starting procedure after the turned position has been reached, the striker levers 113, 114, 115 and 116 on the bridges are automatically restored to the rest position by means of restoring arms 134, 135 and 136, Figures 10, 12 and 13, mounted at the tops of the vehicles. During the movement of the vehicles these restoring arms freely pass the lock levers 128, 133 and so forth, but they strike the broadened upper ends of the striker levers 114, 115 and 116 and move these levers back into the rest positions 114′, 115′ and 116′, where they are held by the engagement of the locking levers 128, 133 and so forth. The striker lever 113 on the first bridge 103 has already returned to the rest position 113′ at the beginning of the turning movement of the bridge since at this point the rod head 121 slides off the lever end 119, so that the compression spring 120 pushes the rod 122 into the position 122′. Only after the second turning procedure, that is, after a total run of 360° of the bridge 103, will the head 121 again come into contact with the lever end 119, and then only when the rail end is unloaded and has the position 117, the angle lever thus having the position 119 and not 119′.

In order to ensure this an inclined guide surface 137 is provided on the fixed rail part on which at the end of the turning movement the head moves from the position 121' to the position 121 and can therefore never strike the lever arm 119 laterally.

The arrangements here described and illustrated in Figures 10 to 13 are only given as examples. The same principles underlying these devices can also be carried into effect with other mechanical components as well as with electric or compressed air transmission.

We claim:

1. A turning arrangement for mono rail suspended vehicles, in particular for propeller driven high speed trains, in which a plurality of turning bridges are arranged in series, each of which takes a part of the vehicle train and turns it into the new running direction.

2. A turning arrangement according to claim 1, in which a driving gear turns the series of bridges simultaneously by a synchronised coupling.

3. A turning arrangement according to claim 1, with two railed bridges, in which fixed rail pieces of sufficient length are provided between the bridges in series to permit the double rail ends to pass one another freely during the turning movement.

4. A turning arrangement according to claim 1, with two railed bridges in which the closely placed bridges in series are provided with swinging rail ends of such length as to permit free passage past one another of the double rail ends during the turning movement.

5. In a device for reversing the direction of travel of a train of vehicles upon a track, a plurality of turn-tables arranged in a series.

6. In a device for reversing the direction of travel of a train of vehicles upon a track, a plurality of turn-tables arranged in a series, and means for rotating said turn-tables substantially simultaneously.

7. In a device for reversing the direction of travel of a train of vehicles upon a track, which vehicles each have projecting therefrom means for actuating uncoupling devices and for setting the brakes, a plurality of turn-tables arranged in a series, means for rotating said turn-tables and means, actuated by the movement of the train onto the turn-tables, for successively operating said projecting means as the vehicles reach their respective turn-tables.

8. In a device for reversing the direction of travel of a train of vehicles upon a track, which vehicles have uncoupling and brake-setting members projecting therefrom, a plurality of turn-tables arranged in a series, means for rotating said turn-tables and means, actuated by the movement of the train onto the turn-tables, for successively operating the uncoupling members as the vehicles reach their respective turn-tables, and means for operating the brake-setting members of the vehicles simultaneously with the operation of the respective uncoupling devices.

9. Apparatus for operating the uncoupling and braking levers of a train of vehicles, comprising a plurality of pivoted striking levers positioned to normally lie in the path of the uncoupling and braking levers, means for locking said striking levers in inoperative position, and means for successively releasing said locking means.

10. In a device for operating the uncoupling and braking levers of a train of vehicles comprising, a plurality of pivoted locking levers arranged in a series, and positioned to normally lie in the path of said uncoupling and locking levers, a locking lever for each striking lever for holding the same in inoperative position, a push rod disposed adjacent each locking lever for tripping the same and an intermediate lever disposed between said tripping lever and said push rod and actuated by movement of said tripping lever from inoperative to operative position to actuate the adjacent push rod.

11. In apparatus for reversing the direction of travel of a train of vehicles upon a track, which vehicles have uncoupling and braking levers, the combination with a plurality of turn-tables, of actuating means associated with each of said turn-tables for cooperation with said uncoupling and braking levers, means for locking said actuating means in inoperative position, and means actuated by the movement of the rear-most vehicle of said train onto its turn-table for releasing the locking means associated with the turn-table corresponding to the rear most vehicle.

12. The invention as set forth in claim 11, wherein is provided means actuated by the movement of each vehicle onto its turntable for releasing the locking means associated with the turn-table corresponding to the immediately preceding vehicle.

In testimony whereof we affix our signatures.

CURT STEDEFELD.
WILLY BLACK.